United States Patent
Hsing

[19]

[11] Patent Number: 5,879,726
[45] Date of Patent: Mar. 9, 1999

[54] LOCKING APPARATUS FOR UPPER AND LOWER MOLDS OF A PRESS

[75] Inventor: Cheng Chao Hsing, Taipei, Taiwan

[73] Assignee: Gallant Precision Machining Co., L.T.D., Taiwan

[21] Appl. No.: 866,487

[22] Filed: May 30, 1997

[30] Foreign Application Priority Data

Nov. 21, 1996 [TW] Taiwan ................................. 85217885

[51] Int. Cl.⁶ .................................................. B29C 45/66
[52] U.S. Cl. .................................... 425/451.2; 425/451.7; 425/451.9; 425/590; 425/595
[58] Field of Search .............................. 425/451.2, 451.7, 425/451.9, 590, 595

[56] References Cited

U.S. PATENT DOCUMENTS

| | | | |
|---|---|---|---|
| 4,797,086 | 1/1989 | Adachi | 425/590 |
| 4,929,165 | 5/1990 | Inaba et al. | 425/451.2 |
| 4,968,239 | 11/1990 | Inaba et al. | 425/451.2 |
| 5,190,714 | 3/1993 | Reinhart | 425/590 |
| 5,698,240 | 12/1997 | Haguchi | 425/451.2 |

*Primary Examiner*—James P. Mackey
*Attorney, Agent, or Firm*—Fulbright & Jaworski L.L.P.

[57] ABSTRACT

A locking apparatus for an upper mold and a lower mold of a press apparatus includes a ball screw, a screw nut, a force producing spanner structure and at least one engagement structure. The screw nut is responsive to a first power source for driving the ball screw in an axial direction to perform a lower-pressure higher-speed stroke. The spanner is responsive to a second power source for producing a force in circumferential direction. The engagement structure is arranged around an external rim of the screw nut. Responsive to the force in the circumferential direction, the engagement structure closely engages with the external rim of the screw nut such that a corresponding friction force is applied to the screw nut. The screw nut, responsive to the friction force, drives the ball screw in the axial direction to perform a higher-pressure stroke to lock the upper mold and lower mold.

3 Claims, 4 Drawing Sheets

LOCKING APPARATUS FOR UPPER AND LOWER MOLDS OF A PRESS

BACKGROUND OF INVENTION

The invention relates to a locking apparatus for upper and lower molds of a press.

The press is a widely used machine for making various industrial products. For instance, during package stage of semiconductor die, the press has been used together with transfer molds to effect the package of the semiconductor die.

It is well known in the arts that a top platen and bottom platen are provided in the press. The top platen accommodates the upper mold, e.g. transfer mold, and the bottom platen accommodates the lower mold. At the last stage of production of the product, the upper and the lower molds are moved toward each other relatively by operation of press such that they closely match against each other, i.e. a press-match condition. In general, the top platen together with the upper mold is arranged to be stationary and the lower platen together with the lower mold is pushed upward by mechanism of the press to reach the final match-press condition.

The upward movement (stroke) of the lower mold is divided into two different stages which includes a higher-speed lower-pressure long stroke (first stroke) and a lower-speed higher-pressure short stroke (second stroke). At the end of first stroke of operation, the lower mold is only in contact with the upper mold without exerting a strong pressing force to the upper mold. It is the second stroke of the operation which only drives the lower mold by a very short distance and exerts an extreme large force to closely press the molds together. The operation of second stroke of the lower mold is also referred as locking of the upper and lower molds of a press.

In the conventional press machine, the mechanisms performing the locking operation includes well known hydraulic direct-drive type, mechanical crankshaft-drive type, or complex combination of hydraulics and crankshaft drive. However, those well known arts, more or less, experience some drawbacks, i.e. oil leakage, un-expected fluctuation of pressing force, non-uniformity of friction detriment of the crankshaft part after a period of operation, releasing of the pressing force.

To overcome the drawbacks of the conventional approach, the invention provides a locking apparatus which easily applies a desired pressing force and the pressing force may be released also easily by a simple mechanism.

Another object of the invention is to provide a locking apparatus which has smaller size, simple and effective mechanism.

SUMMARY OF THE INVENTION

A locking apparatus, which produce a higher-pressure locking force to lock the upper mold and lower mold of the press, is provided.

The locking apparatus includes a ball screw, a screw nut, a force producing means and at least an engagement means. The screw nut is responsive to a first power source for driving the ball screw in an axial direction to perform a lower-pressure higher-speed stroke. The force producing means is responsive to a second power source for producing a force in circumferential direction. The engagement means is arranged around an external rim of the screw nut. Responsive to the force in circumferential direction, the engagement means closely engages with the external rim of the screw nut such that a corresponding friction force is applied to the screw nut. The screw nut, responsive to the friction force, drives the ball screw in the axial direction to perform a higher-pressure stroke to lock the upper mold and lower mold.

In a preferred embodiment, the force producing means is in form of a spanner.

In a preferred embodiment, the engagement means is a ball.

In another preferred embodiment, the engagement means is a cylinder.

BRIEF DESCRIPTIONS OF THE DRAWINGS:

FIG. 1 discloses an explosive view of the invention.

FIG. 2 discloses the invention is assembly form.

FIG. 3 discloses the invention in one section view.

FIG. 4 discloses the status of the engagement means as the force is not applied to the spanner.

FIG. 5 discloses the status of the engagement means as the force is applied to the spanner.

DETAILED DESCRIPTION OF THE INVENTION

Figure 1:
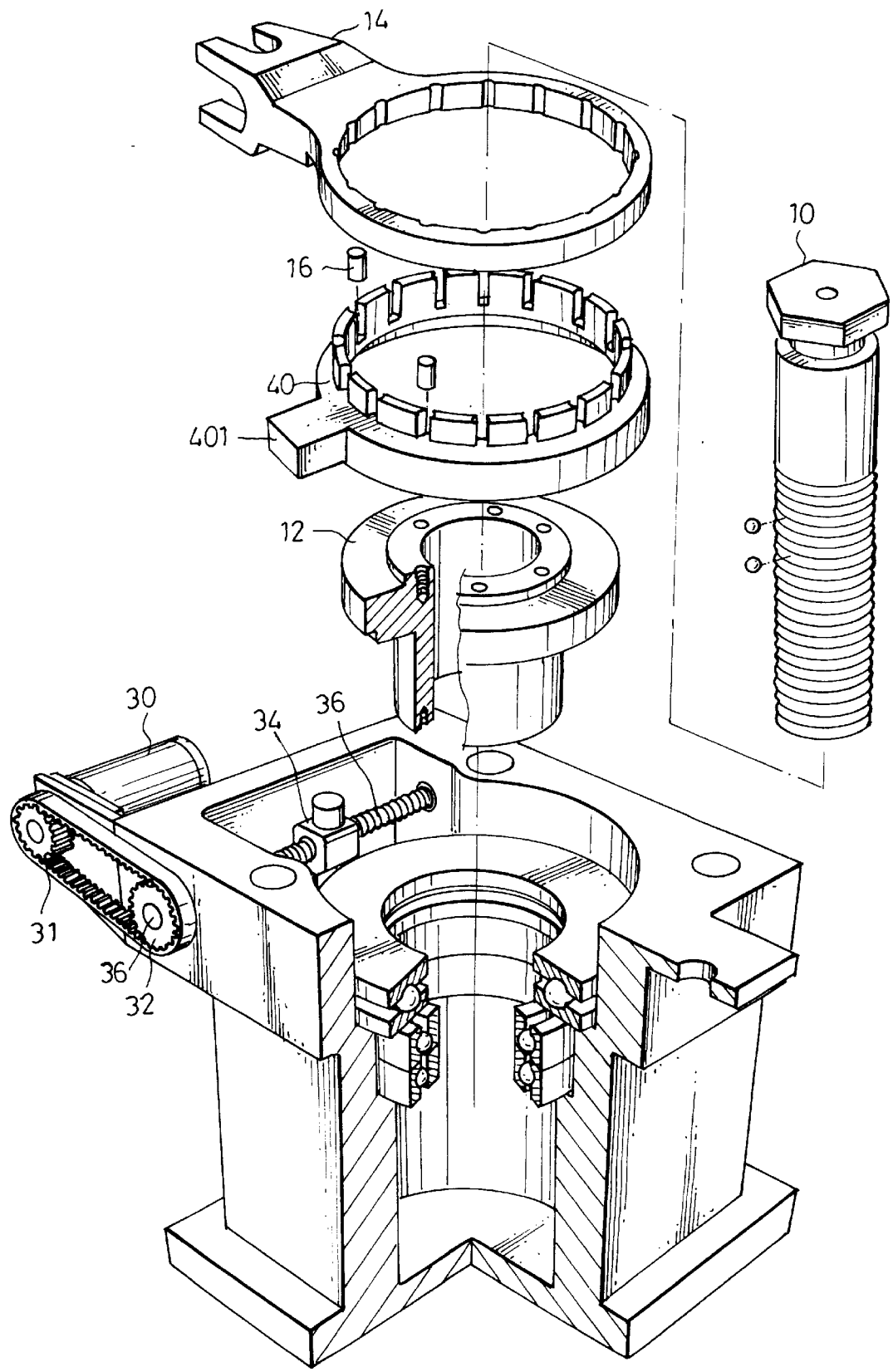

As shown in FIG. 1, the locking apparatus 1 of invention includes a ball screw 10, a screw nut 12, a spanner 14, at least an engagement device 16.

Figure 2:
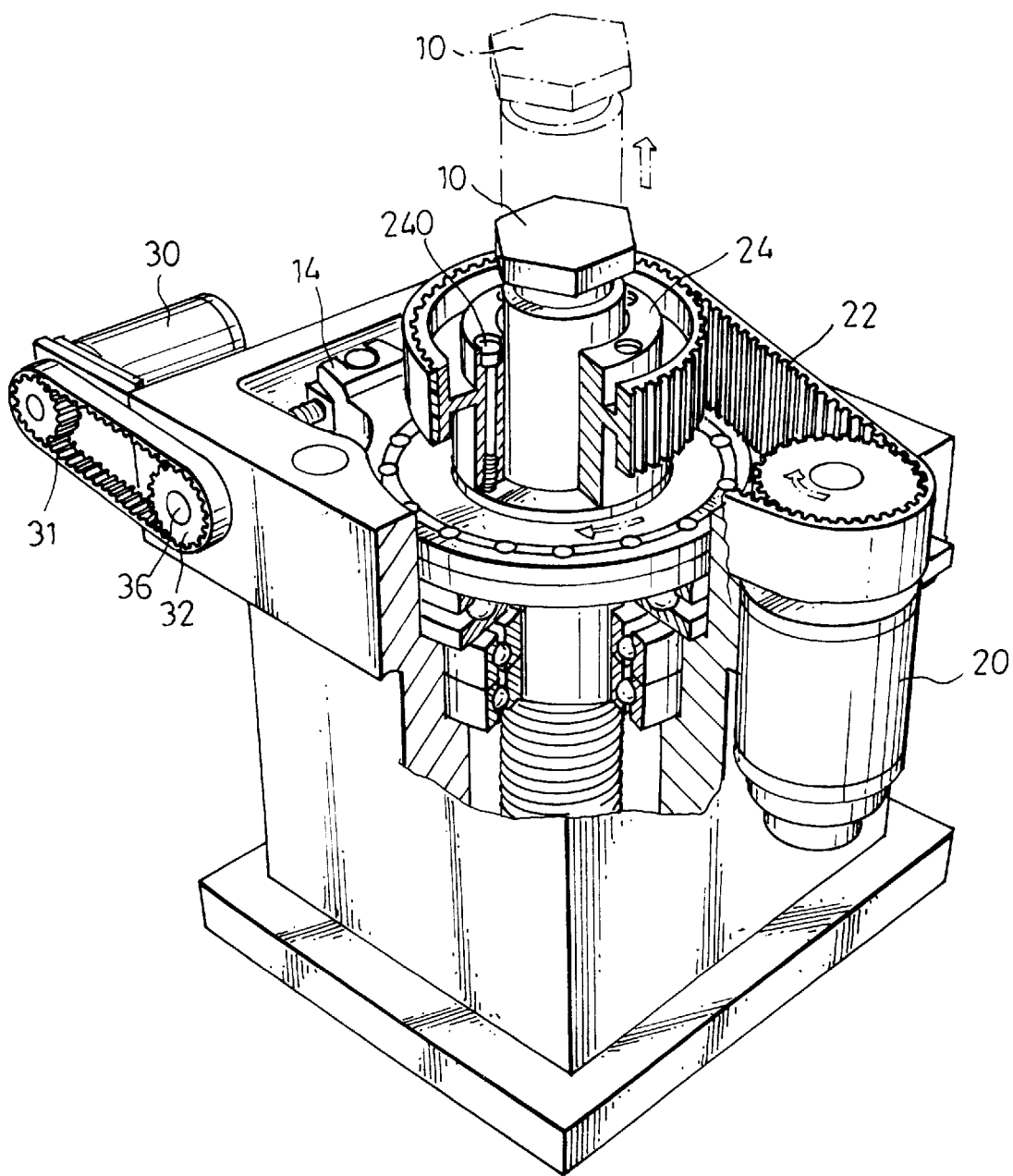
Figure 3:
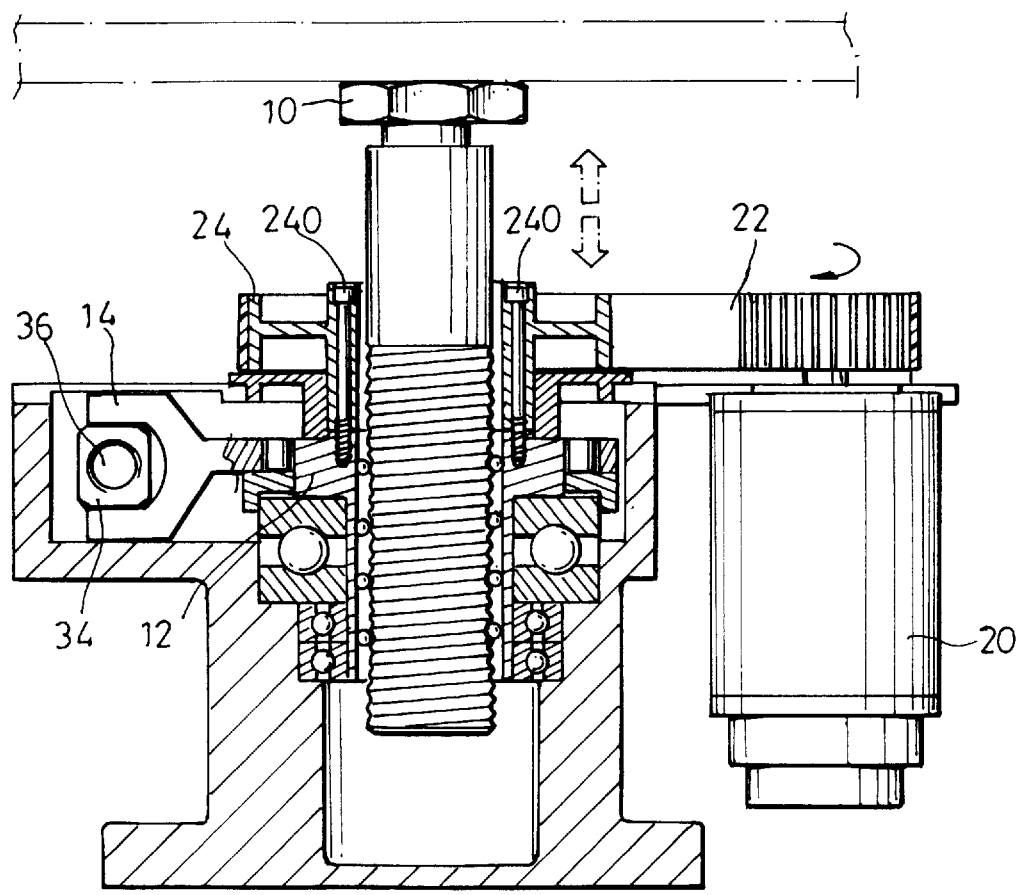

As disclosed in FIG. 2 and 3, the first power source 20, via a transmission apparatus, i.e. belt 22, drives to rotate the pulley 24. The pulley 24 is connected, through at least two bolts 240, to the screw nut 12, as shown in section view of FIG. 3, to drive the screw nut 12. The ball screw 10 is refrained from rotational movement such that, as the screw nut 12 rotates responsive to the first power source 20, the ball screw 10 moves upward in a higher speed, due to the function of the balls therein. This higher speed upward movement is the higher speed lower pressure stroke mentioned above. At the end of this stroke, the lower mold along with the bottom platen on the ball screw 10 (imagine line in FIG. 3) contacts with the upper mold. But a press-match condition is not yet reached at this point.

Following the above operation, the second power source 30, i.e. motor, supplies power, via the belt gear 32, to drive the second screw nut 34 and the second ball screw 36. Since the second ball screw 36 rotates as result of the transmission element 31, i.e. belt, the second screw nut 34 moves along a straight line. The movement of the second screw nut 34 therefore drives the connected spanner 14 to rotate in a small angle.

Figure 5A:
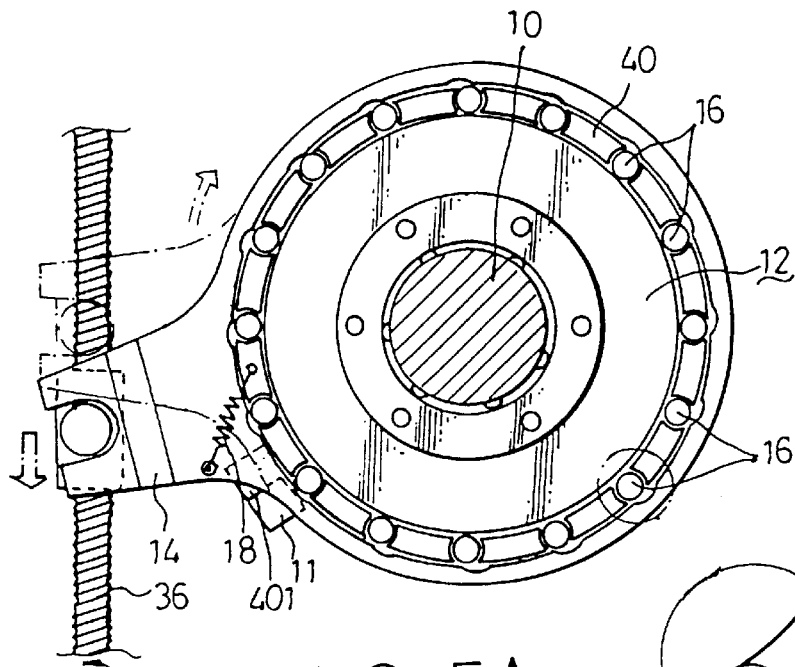
Figure 5B:
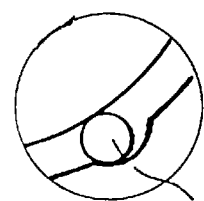
Figure 4A:
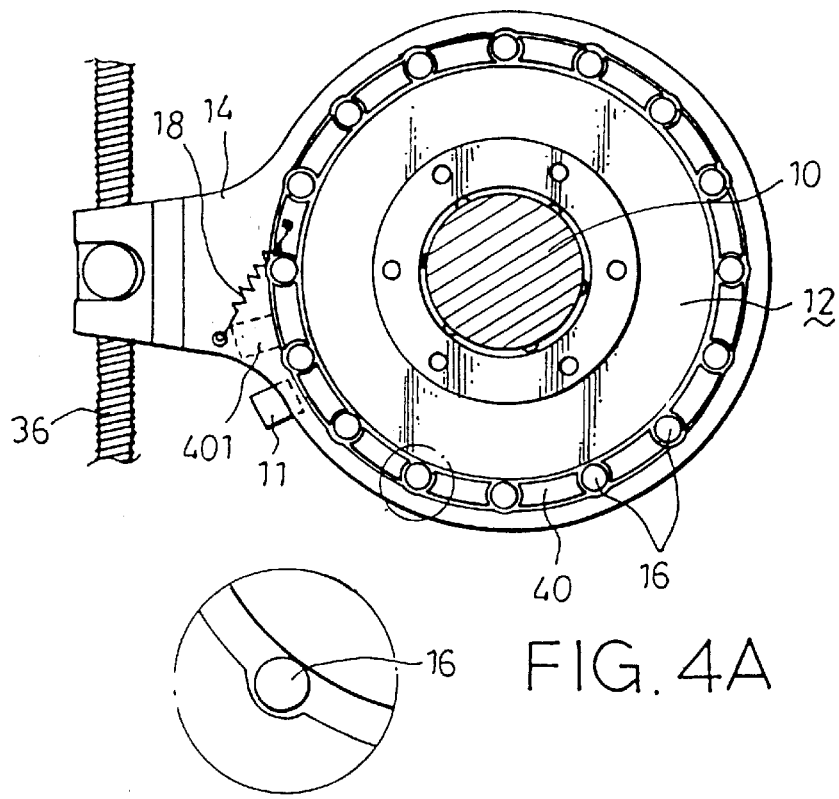
Figure 4B:
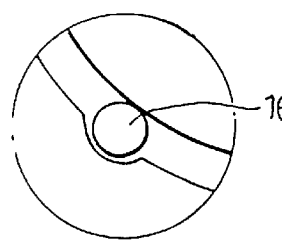

As the spanner 14 rotates in clockwise direction, the internal rim of the spanner 14 presents a relative movement with respective to the engagement device 16, that is, from state shown in FIG. 4 to that of FIG. 5.

In state of FIG. 4, the spanner 14 does not apply force, and the engagement device 16 is free from the surrounding elements. Therefore, during this time, the screw nut 12 does not make the ball screw 10 move upward to supply a huge press-match force. But in state of FIG. 5, the spanner 14 applies a force, and the engagement device 16 is in close engagement relation with the external rim of the screw nut 12 and the internal rim of spanner 14. During this later stage, the spanner 14 intends to drive the screw nut 12 to rotate. However, since the ball screw 10 is prohibited to rotate, a small amount of upward displacement of the ball screw 10 occurs. This small amount of upward displacement then creates a huge press-match force as desired to force the upper and lower molds closely contact with each other.

To release this higher-pressure press-match force, the second power source 30 is reversed to its initial position. Due to the functions of spring 18 and the blockade 11 with respect to the cage 40, the spanner 14 resumes its initial state shown in FIG. 4.

In a preferred embodiment, the engagement device 16 is a ball or a cylinder made of hard material, i.e. metal. The cage 40 functions to hold and move the plurality of balls or cylinders at the same time.

From above detailed recitations, it is readily known the locking apparatus of the invention has simple mechanism and operation to provide the desired locking force. Force applied on the spanner 14 may create the huge press-match force by the ball screw 10. The press-match force created is non-fluctuating, stable and easily controlled.

I claim:

1. A locking apparatus for upper and lower molds of a press, comprising:

a ball screw defining an axial and a circumferential direction for the apparatus;

a screw nut, responsive to a first power source, for driving the ball screw in the axial direction to perform a lower-pressure higher-speed stroke, the screw nut having an external rim portion;

a spanner structure, responsive to a second power source, for selectively producing a force in the circumferential direction, the spanner structure having an inner wall having a plurality of edge portions, each of the edge portions defining an edge for a cavity alone the wall;

at least one engagement structure arranged around the external rim portion of the screw nut, the engagement structure movably received in the space between the external rim portion of the screw nut and a spanner wall edge portion for a cavity, the engagement structure exerting substantially no force on the external rim portion of the screw nut in the absence of a driving force from the second power source, and as a driving force from the second power source is applied to drive the spanner, the engagement structure frictionally engaging the external rim portion of the screw nut and the inner wall of the spanner in the vicinity of the edge portion to drive the screw nut, and the screw nut, responsive to the friction force, driving the ball screw in the axial direction to perform a higher-pressure stroke to lock the upper mold and lower mold.

2. The locking apparatus in claim 1, wherein the engagement structure is a ball.

3. The locking apparatus in claim 1, wherein the engagement structure is a cylinder.

* * * * *